A. E. SNOW.
TRACTION BLOCK FOR AUTOMOBILES.
APPLICATION FILED JUNE 23, 1920.

1,366,031.

Patented Jan. 18, 1921.

INVENTOR
Arthur E. Snow,
By Arthur H Ewald,
Attorney.

UNITED STATES PATENT OFFICE.

ARTHUR E. SNOW, OF NORWOOD, OHIO.

TRACTION-BLOCK FOR AUTOMOBILES.

1,366,031.  Specification of Letters Patent.  Patented Jan. 18, 1921.

Application filed June 23, 1920. Serial No. 391,150.

*To all whom it may concern:*

Be it known that I, ARTHUR E. SNOW, a citizen of the United States, and resident of Norwood, in the county of Hamilton and State of Ohio, have invented certain new and useful Improvements in Traction-Blocks for Automobiles, of which the following is a full, clear, and exact description, reference being had to the accompanying drawings, forming a part of this specification.

My invention relates to traction blocks to provide gripping or traction surfaces to the wheels of an automobile when so situated that the roadway or other natural surface does not provide the necessary traction.

When the rear or traction wheels of an automobile become mired or otherwise so situated that the roadway or other surface does not provide the required traction to propel the vehicle, it is necessary either to tow the vehicle out of such situation, or to provide mechanical means whereby the wheels are permitted to obtain the necessary grip. For this purpose, various devices, such as chains and ropes secured to the wheel, and ordinary boards or other blocks interposed under the wheels, have been used. All of such devices heretofore used, however, have been subject to certain inconveniences or insufficiencies in use, for instance where a flat board or block is put under the wheel, it is liable to shift laterally or be propelled longitudinally under the wheel, in either of which cases the desired object is thwarted. The principal object of the present invention is, therefore, to provide a traction block, which, in connection with a suitable gripping or traction surface, is provided with means to prevent the same slipping either laterally or longitudinally beneath the wheel.

Further objects of the invention will appear from the following detailed description thereof.

Figure 1:
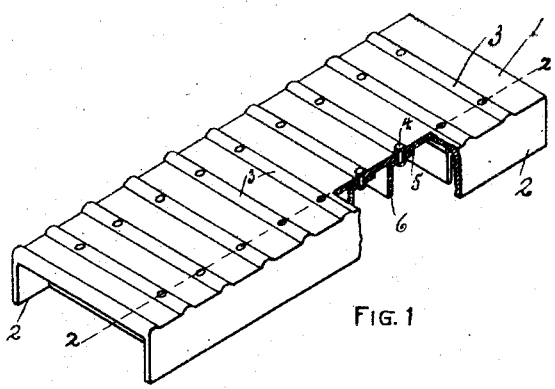
Figure 1 is a perspective of the traction block, part being broken away more clearly to show the construction.

The numeral 1 indicates a metal or other block of suitable proportions, the same being provided with depending longitudinal flanges 2. The upper surface of the block 1 is provided with ridges or corrugations 3, to provide suitable gripping means. Secured transversely on the under side of the block 1, between the flanges 2 by rivets 4 or other suitable means, are angle irons 5 which provide flanges 6 projecting downwardly from the under side of the block.

Figure 2:
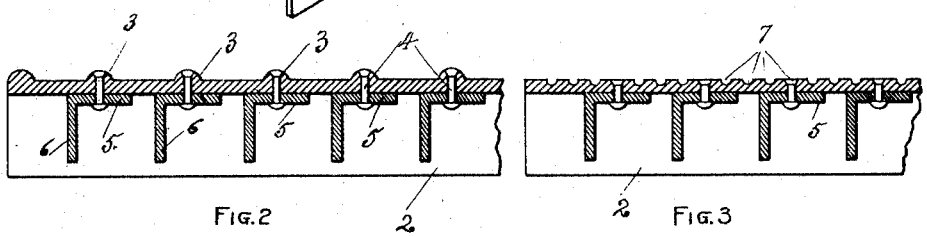
Fig. 2 is a longitudinal section on line 2—2 of Fig. 1.
Figure 3:
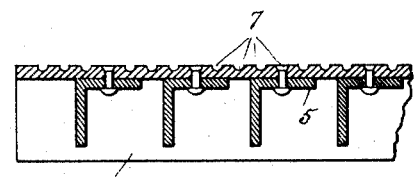
Fig. 3 is a similar section illustrating a modified form of gripping surface.

In Fig. 3 I have shown a gripping surface comprising transverse grooves 7 in place of the ridges or corrugations 3 of Figs. 1 and 2.

Figure 4:
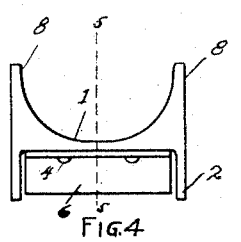
Fig. 4 is an end view of a traction block illustrating the adaptation of the invention for use with pneumatic tires.
Figure 5:
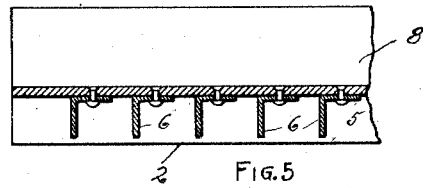
Fig. 5 is a longitudinal section on line 5—5 of Fig. 4.

In order to adapt the device more particularly for pneumatic tires, the upper surface of the block 1 is channeled as shown in Figs. 4 and 5 so as to fit about the tread of a pneumatic tire, upwardly projecting flanges 8 fitting against the sides of the tire. In such adaptation, the device may of course be provided with gripping means such as the ridges 3 or grooves 7 if desired, the same being omitted, however, in the drawings.

Figure 6:
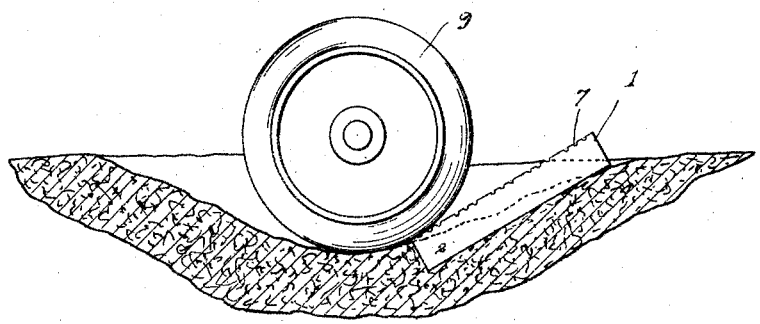
Fig. 6 is a diagrammatic view illustrating the use of the invention.

The operation of the device will be apparent from the foregoing description thereof. Such operation is also indicated in Fig. 6 of the drawings wherein an automobile wheel 9 having become mired in a hole in the roadway, a block 1 constructed in accordance with this invention, is placed in front of the wheel. When so placed the weight of the vehicle upon the block causes the flanges 2 and 6 to engage in the soil and prevent both lateral and longitudinal slipping of the device. The wheel is thus permitted to gain traction on the surface of the block and propel itself and the vehicle forwardly and out of the mire or rut and onto a suitable roadway.

Having thus fully described my invention what I claim as new and desire to secure by Letters Patent, is:

A traction block comprising a plate, downwardly projecting longitudinal flanges along the sides of said plate, a series of angle bars secured to the under side of said plate so as to form transverse flanges between said longitudinal flanges, and traction means on the upper surface of said plate.

ARTHUR E. SNOW.